United States Patent
Augustin et al.

(10) Patent No.: US 9,520,055 B2
(45) Date of Patent: Dec. 13, 2016

(54) PROCESS OF COMMUNICATION BETWEEN A FIRST NODE AND A SECOND NODE OF A HOME AUTOMATION INSTALLATION

(75) Inventors: Barbara Augustin, Scionzier (FR); Florent Pellarin, Saint-Martin Bellevue (FR)

(73) Assignee: SOMFY SAS, Cluses (FR)

( * ) Notice: Subject to any disclaimer, the term of this patent is extended or adjusted under 35 U.S.C. 154(b) by 1640 days.

(21) Appl. No.: 12/398,677

(22) Filed: Mar. 5, 2009

(65) Prior Publication Data

US 2009/0245151 A1 Oct. 1, 2009

(30) Foreign Application Priority Data

Mar. 5, 2008 (FR) .................................... 08 01204

(51) Int. Cl.
*G08C 17/00* (2006.01)
*H04L 12/12* (2006.01)
*H04L 12/28* (2006.01)

(52) U.S. Cl.
CPC .............. *G08C 17/00* (2013.01); *H04L 12/12* (2013.01); *H04L 2012/2841* (2013.01); *Y02B 60/32* (2013.01); *Y02B 60/34* (2013.01)

(58) Field of Classification Search
CPC ....... H04W 52/02; H04W 84/18; H04L 12/12; H04L 2012/2841; Y02B 60/32; Y02B 60/34; G08C 17/00
USPC .......................................................... 370/311
See application file for complete search history.

(56) References Cited

U.S. PATENT DOCUMENTS

| 5,790,946 A | 8/1998 | Rotzoll |
| 2002/0172186 A1* | 11/2002 | Larsson ........................ 370/349 |
| 2004/0077383 A1 | 4/2004 | Lappetelainen et al. |
| 2004/0190467 A1* | 9/2004 | Liu et al. ...................... 370/311 |

(Continued)

FOREIGN PATENT DOCUMENTS

| EP | 0 317 007 A | 5/1989 |
| EP | 1 033 832 A | 9/2000 |
| EP | 1 873 972 A | 1/2008 |

OTHER PUBLICATIONS

Niyato, Dusit et al.: "Wireless Sensor Networks with Energy Harvesting Technologies: A Game-Theoretic Approach to Optimal Energy Management", *IEEE Wireless Communications*, Aug. 2007, pp. 90-96.

(Continued)

*Primary Examiner* — Stephen J Clawson
(74) *Attorney, Agent, or Firm* — Frommer Lawrence & Haug LLP

(57) ABSTRACT

Method of communication between a first node and a second node of a home-automation installation, the method comprising the transmission of a first signal from a first transmitting part of the first node to a second receiving part of the second node, upon receipt of the first signal by the second node, transmission of a second signal from a second transmitting part of the second node to a first receiving part of the first node, the second signal comprising a signal confirming to the first node that the first signal has indeed been received and understood, and placing in the inactive state or maintaining in the active state the first receiving part as a function of an information cue contained in the second signal received by the first node.

18 Claims, 5 Drawing Sheets

(56) References Cited

U.S. PATENT DOCUMENTS

| | | | |
|---|---|---|---|
| 2004/0215694 A1* | 10/2004 | Podolsky | H04L 12/2803 709/201 |
| 2005/0136914 A1* | 6/2005 | van Kampen | H04W 52/0216 455/426.2 |
| 2005/0237984 A1 | 10/2005 | Benveniste | |
| 2006/0025181 A1 | 2/2006 | Kalofonos et al. | |
| 2007/0002814 A1* | 1/2007 | Benveniste | 370/338 |
| 2008/0181130 A1* | 7/2008 | Balu et al. | 370/254 |

OTHER PUBLICATIONS

Search Report issued by French Patent Office on Nov. 13, 2008 for priority French application 0801204.

* cited by examiner

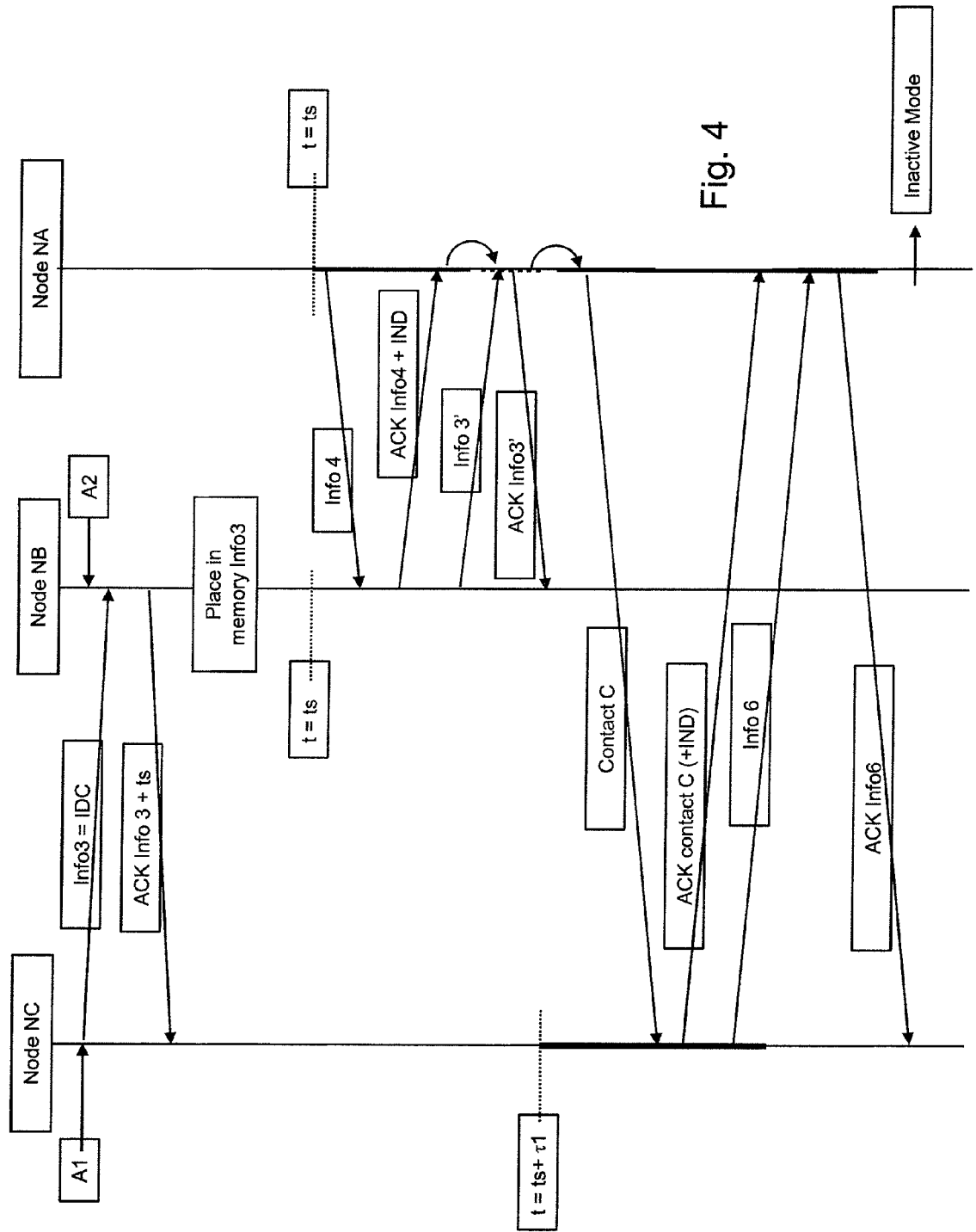

PROCESS OF COMMUNICATION BETWEEN A FIRST NODE AND A SECOND NODE OF A HOME AUTOMATION INSTALLATION

This application claims priority benefits from French Patent Application No. 08 01204 filed Mar. 5, 2008, the disclosure of which is hereby incorporated by reference.

BACKGROUND OF THE INVENTION

The invention relates to the field of communications in a home-automation network comprising a plurality of nodes having to communicate with one another. It relates to a method of communication between various nodes, to nodes implementing such a method as well as to a network comprising such nodes. The invention relates finally to a software module governing operation of one or more nodes in accordance with the method of communication.

These nodes generally correspond to home-automation electrical equipment such as actuators, electrical load controls, automation control devices such as sensors or remote control points. These nodes comprise command transmitters and/or receivers. In particular, in wireless home-automation networks in which the communication is effected via electromagnetic media (radiofrequency waves for example), they comprise wireless command transmitters and/or receivers.

The invention applies in particular to so-called self-powered nodes, that is to say ones comprising their own energy source. This energy source may be a battery. On account of this autonomy, it is necessary to guarantee minimum consumption so as to save the limited resources.

Additionally, reducing the consumption of mains-powered equipment is also of concern. In particular, it is best if the standby consumption of such equipment, that is to say the consumption linked solely with a standby state, for example when waiting for information or a control command, is reduced.

Additionally, it may turn out to be useful, depending on the functions ensured by the nodes, to be able to reach one of the self-powered nodes, in an impromptu manner.

DESCRIPTION OF THE PRIOR ART

Various documents of the prior art provide information about various procedures aiming at reducing the global consumption of a subset of a home-automation network comprising a transmitting part and a receiving part, that is to say mainly the consumption of the receiving part, in particular in a standby state.

During conventional operation, the receiving part, if it is left permanently listening for a possible message, consumes a large part of the energy resources.

A first solution consists in alternating standby phases and wakeup phases for this receiving part, calculated so that the receiver can intercept a message, should one be addressed to it.

A second solution consists in providing a wakeup device with low consumption, making it possible to render the receiving part sensitive to a wakeup signal. When such a signal is identified, the wakeup device triggers total wakeup of the receiving part with a view to processing the complete signal. After a given time interval, the receiving part goes back to sleep. Such devices are described in the documents U.S. Pat. No. 5,790,946 or EP 0 317 007.

For both these solutions, the consumption is then lower but, however, incompatible with long lifetime of the batteries, contrary to the specifications of certain applications.

These principles have the advantage however, as in the conventional case defined above, of enabling communication between two nodes, without any delay observable by the user.

Patent application WO 2006/006116 relates to an alternative solution, in which a receiver is woken up according to a given schedule and informs a transmitter of this schedule. Thus, the transmitter and the receiver can synchronize to communicate at given intervals. In such time synchronization, widely used in numerous communication systems requiring very low consumption, the receiver is therefore reachable only at the moment of the scheduled exchanges.

Patent application US 2004/0077383 describes a system for wireless bidirectional communication between two self-powered items of equipment. The first transmits event messages for the attention of the second, which informs the latter that it can collect information. A solution for reaching one of the first items of equipment consists in having the first item of equipment scheduling a fixed listening time following the transmission of the event message while on standby, awaiting a response from the second item of equipment.

This solution is not satisfactory, since the systematic listening time subsequent to each communication is usually unnecessary and represents energy waste.

Other documents, such as for example application EP 1 033 832, relate to decreasing the consumption of self-powered mobile stations. In particular in this document, the mobile stations wake up in a periodic manner and check the reception of indicator messages termed "Traffic Indicator Messages" or TIMs indicating the presence of data messages in the memory of a master station, which have to be sent to them. Upon receiving an indicator message which is intended for it or intended for the whole set of stations, a mobile station waits in wakeup mode for one or more data messages to be sent to it. The indicator message TIM can comprise the quantity of data messages in memory and/or the recipient or recipients. These arrangements allow each mobile station to better manage its consumption, that is to say in particular its wakeup time.

This document relates, however, essentially to the self-powered equipment which, among their main functions, include that of checking whether an attempt is being made to reach them.

Conversely, in a home-automation system, control points or sensors dispatch a certain quantity of information to a node associated with an actuator, the latter possibly taking this information into account in order to act. This information takes the form of measurements, commands or signaling of an event. It may be transmitted in a regular manner or with no regularity, for example upon the occurrence of an event detected by the sensor. The main task of these communication nodes is to provide information, not to receive any, and this remains true even though they comprise a reception function.

Within the context of bidirectional communication systems, each communication node is indeed both a receiver and a transmitter. A communication node associated with an actuator transmits, once an information is received, a return message confirming in particular that the information has indeed been received. If the information originates from a control point, and corresponds for example to a control command following a user action, the information return message informs the control point of the due consideration of the command received and/or of a possible change of state of the controlled device. It is therefore the sensors and control points which take the initiative in the communication and mainly provide the information.

Outside of this exchange, for energy saving reasons, the receiving part of the sensor and/or of the control point is non-active. If it is necessary to reach these nodes, an option consists in executing a physical action on them so as to wake up their receiving part. However, the sensors in particular may be placed in locations that are difficult to access and therefore such an action proves to be complicated. The implementation of some of the solutions presented above may also be applicable but these solutions are not completely satisfactory, in particular from the point of view of autonomy.

SUMMARY OF THE INVENTION

The aim of the invention is to provide a method of communication remedying these drawbacks and improving the methods of communication known in the prior art. In particular, the invention proposes to improve existing communication systems, so as to reduce to the maximum the energy consumption of the self-powered nodes, that is to say those having their own source and providing information to the home-automation system. Nevertheless, the invention makes it possible to remotely reach a receiving part of a node even though the activity of this receiving part is reduced to the minimum time required for each communication.

The method of communication according to the invention is defined by claim 1.

Various modes of execution of the method are defined by claims 2 to 10.

According to the invention, the communication node is defined by claim 11.

Various embodiments of the communication node are defined by claims 12 to 13.

According to the invention, the home-automation installation is defined by claim 14.

DESCRIPTION OF THE DRAWINGS

The appended drawings represent, by way of example, modes of execution of the method of communication according to the invention and an embodiment of a home-automation network implementing the method of communication according to the invention.

FIG. 4 is a diagram representing a third mode of execution of the method of communication according to the invention.

DESCRIPTION OF THE PREFERRED EMBODIMENTS

Figure 1:
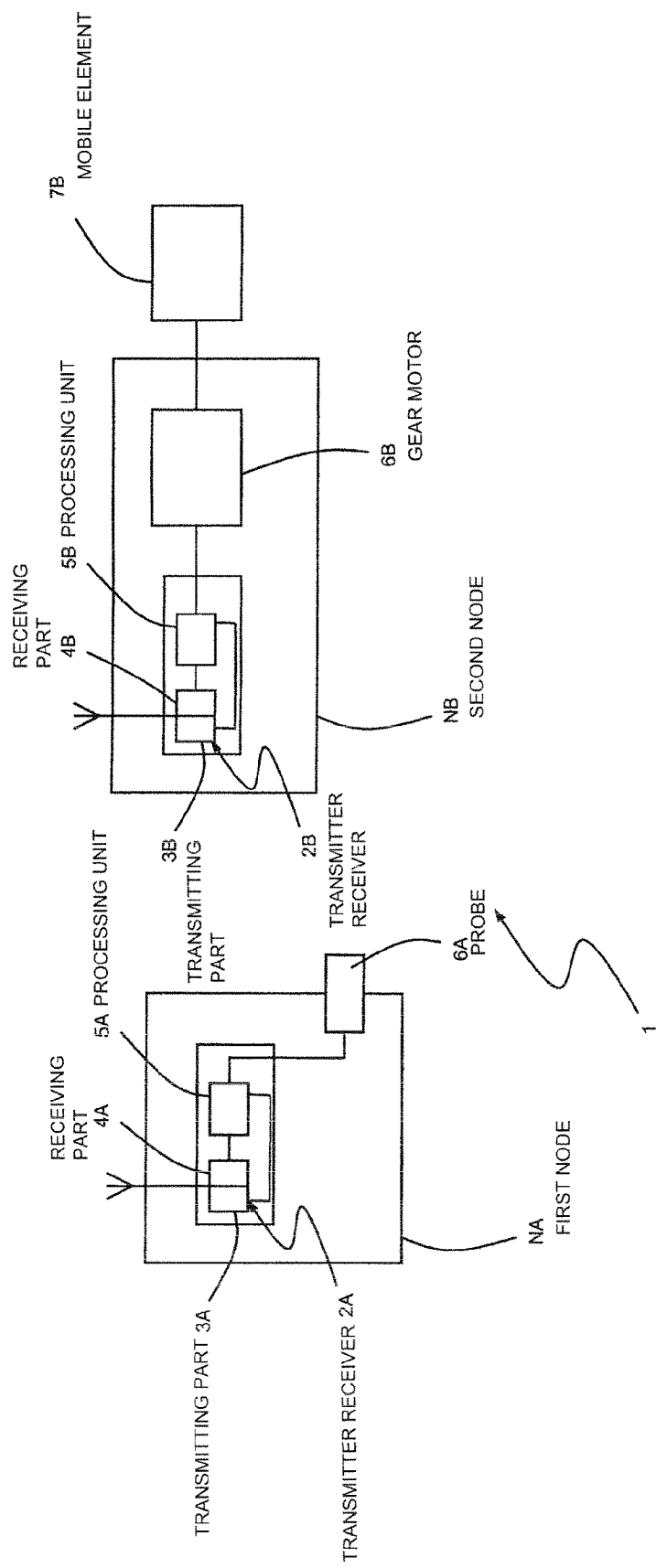
FIG. 1 is a diagram of an embodiment of a home-automation network according to the invention.

The home-automation network 1, represented in FIG. 1, comprises mainly a first node NA and a second node NB. The two nodes are intended for communication with other nodes of the network. In particular, the first and second nodes are intended for communication with one another. They each comprise a transmitter-receiver 2A, 2B including a transmitting part 3A, 3B for transmitting signals and a receiving part 4A, 4B for receiving signals. The communication is for example ensured by a wireless medium such as electromagnetic waves and, in particular, radioelectric waves. For example, the first node NA corresponds to a sensor measuring and/or evaluating an ambient parameter by virtue of a probe 6A. The second node NB corresponds to an item of home-automation equipment such as an actuator comprising a gear motor 6B and commanding the displacement of a mobile element 7B such as a blind. The signals transmitted by the first communication node NA and received by the second communication node NB are control commands for the item of equipment or information messages intended for the equipment and relating to the ambient parameter (for example "wind present", "sun absent", "threshold exceeded"). In return, the signals transmitted by the second node and received by the first node are mostly acknowledgments of receipt and/or acknowledgments of execution.

Each node comprises, in connection with the transmitting and receiving parts, a logic processing unit 5A, 5B. These or some of these logic processing units may comprise means for activating and deactivating the receiving parts. They may also comprise means for triggering transmissions by the transmitting parts. These logic processing units comprise software means for defining operation of the nodes in accordance with the method of communication according to the invention. In particular, the logic processing units comprise software means for implementing the essential steps of the method of communication according to the invention. They comprise in particular a means for detecting the presence or absence of an information in a signal received, a means for interpreting this information or for interpreting its absence and a control means for activating or deactivating the receiving part. The software means comprise computer programs.

Each node also comprises a connection to a power source. The first node NA is a self-powered node, that is to say it has its own power source (for example an electrical energy storage means charged by virtue of a panel of photovoltaic cells). The second node NB is not necessarily self-powered. It may be mains powered. On the other hand, the invention also applies to the case where the second node NB or the whole set of nodes is self-powered.

Figure 2A:
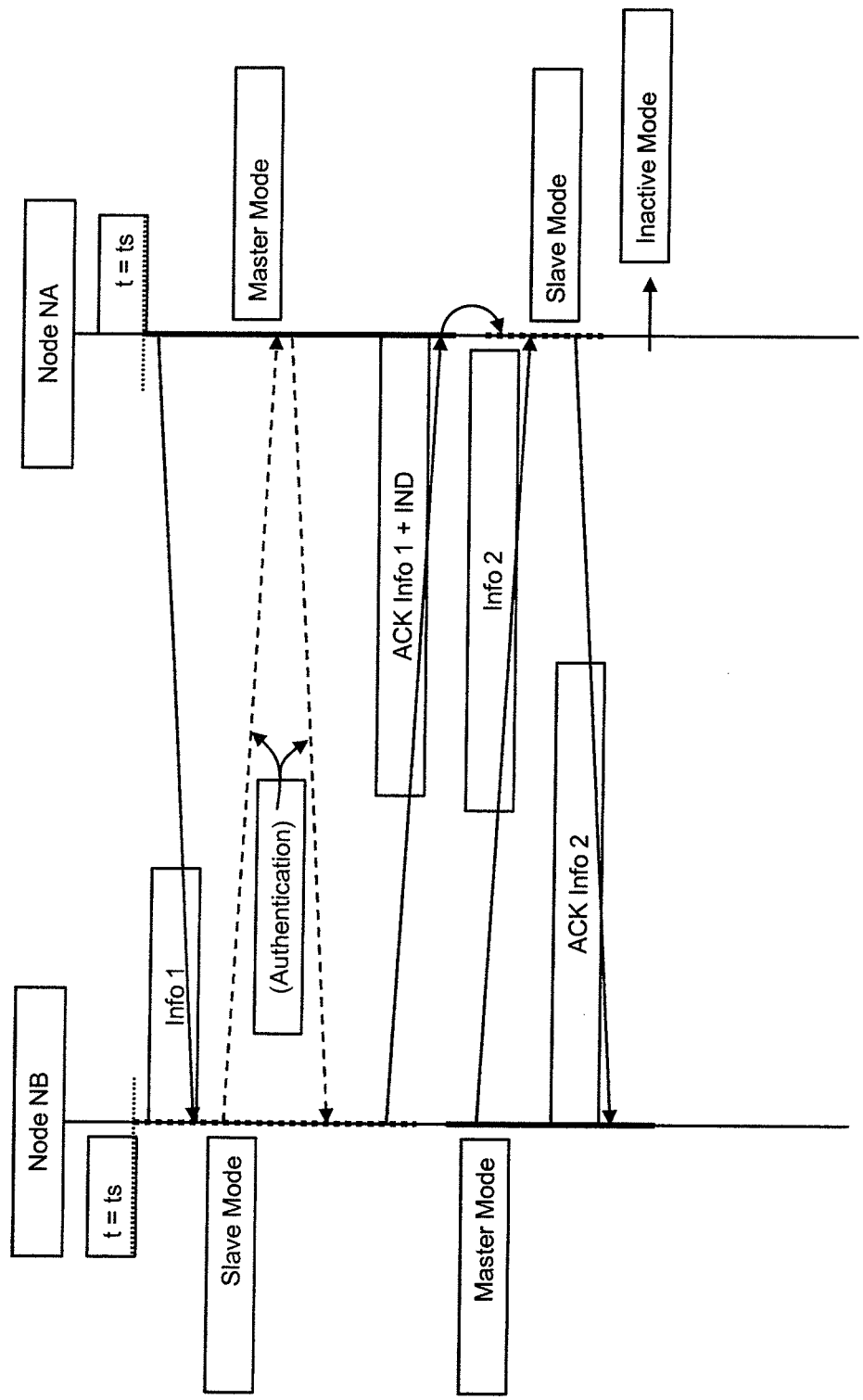
FIGS. 2a and 2b are diagrams representing two variants of a first mode of execution of the method of communication according to the invention.

In an exemplary method of communication according to the invention and illustrated in FIG. 2a, the first node NA corresponds to a meteorological sensor and dispatches information regularly for the attention of an actuator or of a control point corresponding to the second node NB, the latter then implementing if necessary a particular management of the commanded element. For example, if the first node NA signals a wind greater than a predefined threshold, the control point or the actuator corresponding to the second node NB arranges for the blind to be folded up if the latter is folded down (optionally in the case of the control point by a specific order to an actuator) or places itself in a mode in which it does not respond to a manual command to fold down the blind.

Alternatively, if the first node NA is a brightness and/or solar sensor and signals a significant brightness threshold, the control point or the actuator (second node NB) decides to fold down the blind while a third node NL (not represented) linked with a lamp contributes to cutting off the power supply to the lamp whose operation is no longer necessary.

The nodes NA and NB are called paired nodes, that is to say they have exchanged, during a phase of configuring the home-automation network or the home-automation installation, information allowing them subsequently to send dedicated messages to one another. The configuration phase can also comprise a step of defining a synchronization, this step being important or even necessary in the case where the two nodes NA and NB are self-powered. Once configured, the nodes thus communicate in a synchronized manner, that is to say with a fixed deadline, the first node NA transmits a message destined for the second node NB which has placed itself in listening mode. At the instant t=ts, the first node NA transmits a first signal comprising an information message Info1 destined for the second node NB. When the latter receives it, it is in a so-called "Slave Mode", that is to say the second node NB is ready to execute a certain number of programs as a function of the information received from the first node NA. The latter is conversely in "Master Mode" at this level of the communication, that is to say it directs the communication (it initiates it, sends the information necessary for the operation of the installation).

If the second node NB is not a self-powered node, its receiving part can be activated in accordance with a predefined scheme so as to limit the consumption of the node but to react to the messages originating from the first node NA, whether these are transmitted in a regular manner or on an event basis. This embodiment does not change the fact that the first node NA is difficult to reach, or indeed aggravates the problem in particular in the case where the node transmits signals only irregularly, on detection of an event.

A consecutive exchange of information can take place to allow authentication of the nodes communicating, if the latter have, beforehand, during the configuration of the installation and the pairing, exchanged an authentication or encryption key. This exchange known in the state of the art is not detailed here, but simply represented by two dashed arrows.

Subsequent to this exchange, the second node NB confirms to the first node NA that it has indeed received and understood the message Info1 by dispatching a signal denoted ACK Info1.

In the state of the art, either this confirmation closes the communication sequence, or, and in particular in a system for communication between a transmitter and a receiver, the communication is systematically followed by a period of a predefined duration during which the first node NA, receiving the confirmation signal ACK Info 1, remains listening for a possible message.

Here, when necessary, a conversation continuation indicator IND is provided by the second node NB in the signal ACK Info1. This indicator can be contained in the frame or provided in a separate frame immediately before or linked with the frame of the signal ACK Info1.

In the absence of the indicator in the frame ACK Info1, the receiving part of the first node NA returns to an inactive state.

The presence of this indicator causes the first node NA to toggle from the master mode to a slave mode, in which it waits for an information. Specifically, the indicator signals to the first node NA that the second node NB wishes to enter into specific communication with it. Reception of this indicator also indicates to the first node NA that it must remain in listening mode so as to continue the conversation.

The second node NB also changes mode: it toggles from the slave mode to the master mode in which it takes the initiative for the messages transmitted. It can then send to the first node NA a signal containing a second information message Info2. If necessary, this message is authenticated, as explained above (the authentication exchanges are not represented here or subsequently). Reception of the second information message Info2 is then followed by a confirmation signal ACK Info 2, this time from the first node NA to the second node NB. On completion of the latter, the conversation ends and the first node NA, as well as possibly the second node NB, toggle to an inactive mode while waiting for the next communication period fixed by the synchronization between the two nodes or by the listening scheme for the second node NB.

Figure 2B:
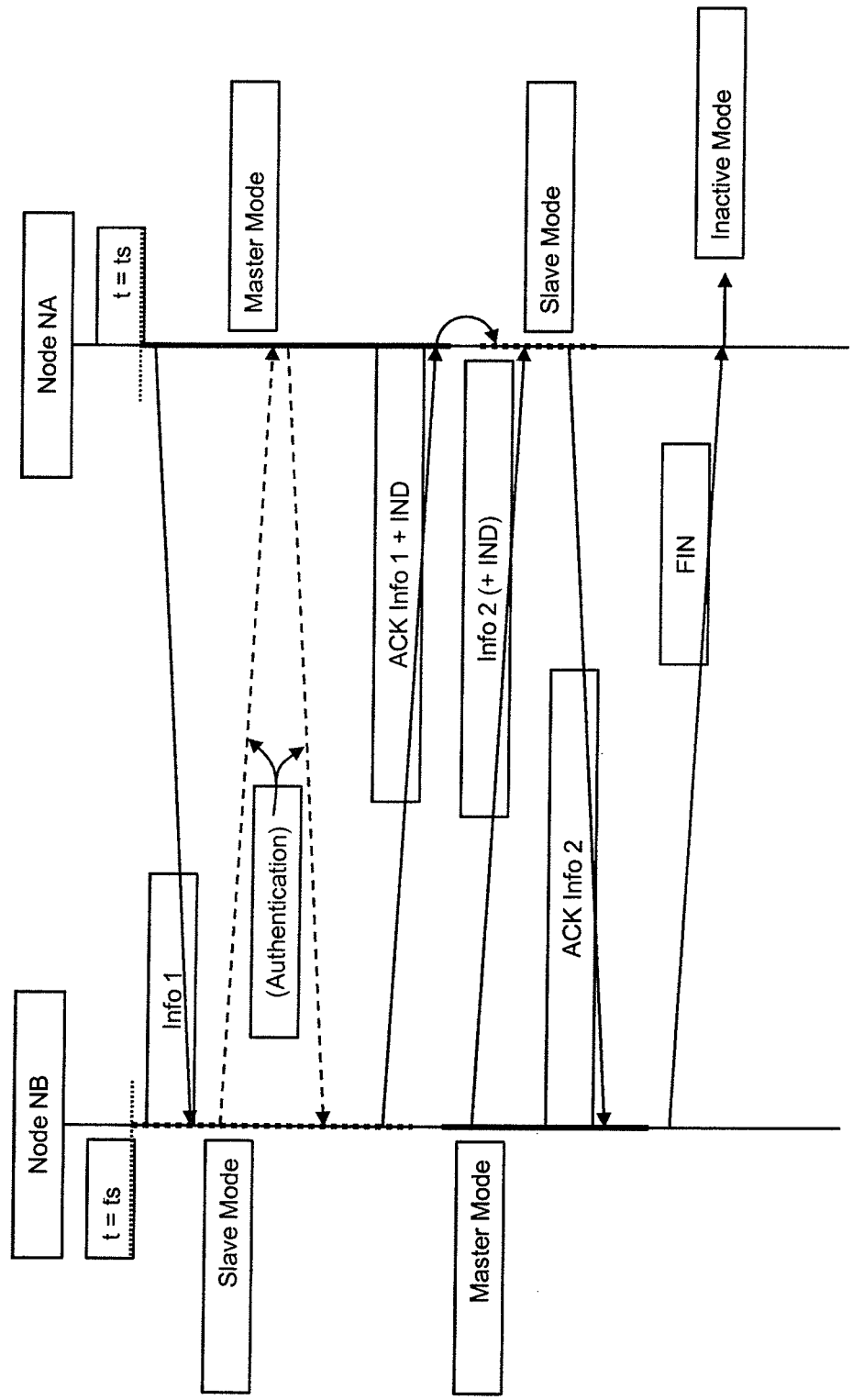

As represented in FIG. 2b, the information message Info2 may itself comprise a communication continuation indicator IND in the case where one or more other messages must still be sent by the second node NB to the first node NA.

Preferably, the indicators or the frames linked to the indicators comprise an indication regarding the quantity of messages to follow or regarding the duration for which the node receiving the indicator must yet remain in listening mode to allow the continuation of the communication.

When the whole set of messages is sent without any new communication continuation indicator or on completion of the period necessary for sending all the messages, the first node NA toggles automatically to an inactive mode, in which it no longer consumes energy to listen for whether a signal is intended for it. Alternatively, at the end of the communication the second node NB transmits a frame comprising an end-of-communication indicator. This frame may be the last information frame or an independent frame. In this alternative case, the first node NA waits for this indicator before switching to the inactive state.

Alternatively, the presence of the second information Info 2 in the frame of the confirmation signal ACK Info1 may itself act as conversation continuation indicator. It is thus not necessary to transmit a new message from the second node NB to the first node NA. This also applies for the rest of the examples described.

Figure 3:
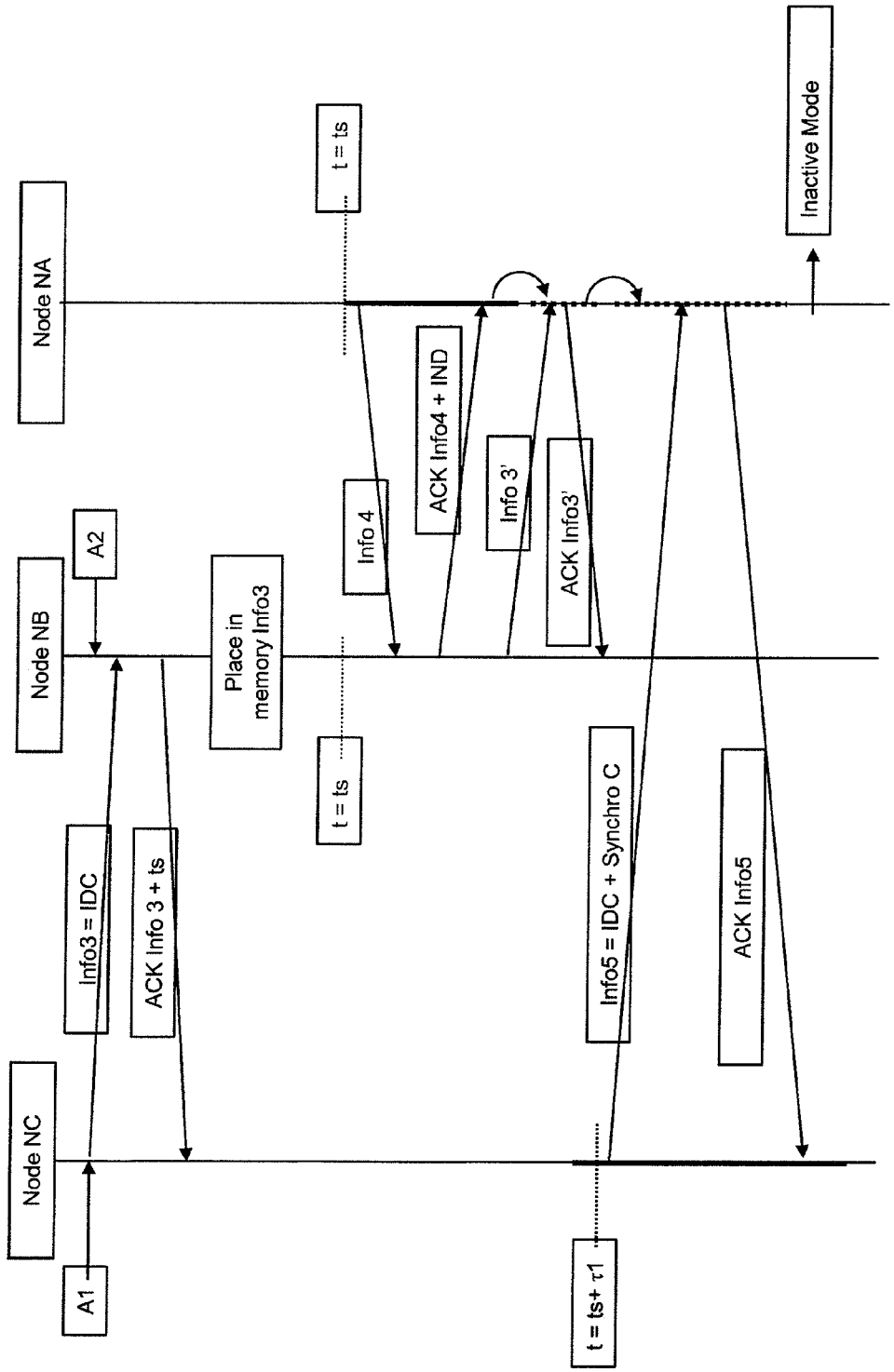
FIG. 3 is a diagram representing a second mode of execution of the method of communication according to the invention.

In other examples of the method of communication according to the invention, illustrated in FIGS. 3 and 4, a third node NC is introduced into the installation and attempts to enter into communication with the first node NA. The latter being in active mode (transmission and listening) only for a very restricted time, just necessary for the predefined communications, it is thus very difficult for a new node to establish a new relationship. This is particularly true in the case where the first node NA is difficult to access physically, such as for example a node corresponding to a wind sensor installed on a roof, or corresponding to a sensor integrated into a hermetic housing.

The second node NB corresponding for example to a control point or to an actuator may be more easily accessible, directly if it is a control point and by means of an associated control point if it is an actuator. The installer knowing the relationships existing between the nodes will use the relationship between the nodes NA and NB for the creation of a new relationship between the nodes NA and NC.

The node NC, like the second node NB, may be a self-powered or non-self-powered node. The following example describes the most constraining embodiment, that is to say when the node NC is also self-powered.

An action A1 at the level of the node NC followed jointly by an action A2 at the level of the second node NB makes it possible to place these two nodes in a mode of communication. The node NC then transmits a signal intended for the second node NB, expressing a third information message Info3. The latter contains for example an identifier characteristic of the transmitter node NC. The message Info3 can also contain an information regarding the type of node with which the node NC is attempting to enter into a relationship (for example the first node NA). Thus, if the second node NB is paired with several other nodes, it is possible for it to determine with which of them the node NC is attempting to communicate.

The second node NB returns to the node NC, on receiving the third message Info3, a confirmation message ACK Info3, as well as a certain quantity of information that may make it possible subsequently to establish a relationship with the first node NA. Among the information there may be a duration ts relating to the synchronization time, allowing the node NC to identify the period during which the first node NA to be reached is listening.

The information contained in the third information message is placed in memory at the level of the second node NB. When the latter receives a signal expressing a fourth information message Info 4 from the first node NA, in accordance with the frequency of communication established between these two nodes, the second node NB returns a confirmation message ACK Info4, with a conversation continuation indicator IND. The presence of this indicator causes the first node NA to switch from the master mode to the slave mode as previously. It is then listening for an information sent by the second node NB. The latter then sends a signal Info3' which includes the third information message Info3, at least partially and possibly in a modified form. The first node NA then has the identifier of the node NC, and this will enable it to identify a message originating from this node.

As in the various previous communications, the first node NA returns a confirmation message ACK Info3' to the second node NB to signal to it that the third message Info3' has been properly received.

The presence of the indicator in the previous confirmation signal ACK Info4 and of the characteristics of a new node also causes the continuation of the listening of the first node NA beyond the communication with the second node NB. With the same aim, the message Info3' may alternatively comprise a communication continuation indicator.

In a first exemplary application illustrated in FIG. 3, the node NC transmits after a time t=ts+τ1 a signal expressing a fifth information message Info 5. The time difference τ1 with respect to the synchronization time ts makes it possible to take into account the time of a communication between the nodes NA and NB.

The fifth information message is intended for the first node NA. As the latter has received the characteristics of the node NC by way of a known node NB, it is disposed to accept a message containing these characteristics, so as to create a new pairing or possibly to modify communication parameters.

This fifth information message Info5 comprises for example the identifier of the node NC as well as a synchronization time SynchroC at which the node NC proposes to communicate with the first node NA.

If this new synchronization is acceptable, the first node NA can confirm the consideration of the new parameters by a message ACK Info5. Otherwise, the conversation can continue as long as necessary until the two nodes come to an agreement.

On completion of this communication, the first node NA returns to an inactive state.

In a second exemplary application illustrated in FIG. 4, starting from a time t=ts+τ1, the node NC places itself in listening mode waiting for a message addressed to it. Following the message for confirming the third message ACK Info3, the first node NA transmits a signal expressing a new message ContactC destined for the new node NC in the installation and containing at least the identifier of the latter node. This message can also contain the identifier of the first transmitting node NA. This new contact is followed by a confirmation message ACK ContactC and by an exchange of information Info 6 between the first node NA and the node NC: a sixth information message Info6 contains for example a new synchronization time proposed by the first node NA. The node NC confirms and terminates the exchange by a confirmation message ACK Info6.

This second example is characterized by the first node NA acting in master mode, while the node NC places itself in a slave mode and waits for the instructions from the first node NA.

Conversely, in the example of FIG. 3, the first node NA operates in slave mode during its exchanges with the node NC which is then in master mode.

These communication schemes allow the configuration of new relationships between self-powered nodes whose listening time is reduced to what is strictly necessary. Specifically, in the example described in FIG. 3, it is entirely possible for the three nodes NA, NB, NC to be self-powered nodes with reduced listening. The method applies alternatively if the nodes are permanently powered, but also when it is desired to reduce the listening and standby times as far as possible.

One or the other of these examples may be used as a function of the configuration of the installation. Other types of exchanges are also possible between the various nodes once the node to be reached has been placed in the active state.

Thanks to the method according to the invention, the first receiving part is not requested longer than necessary. The listening time is not fixed, but is reduced to the time for receiving the information return message in the absence of communication continuation, and is only increased by the duration necessary for the subsequent communication in the contrary case.

The method is advantageously implemented in a synchronized communication with given frequency and shared between the first and the second node. However, it could entirely be implemented within the context of a node having a wakeup function (for example possessing a low-consumption receiver, able to wake up the receiving part for the total consideration of the signal) or in other forms of communication. In this case, the receiving part limits its wakeup time in most cases and accepts to remain awake if necessary, following a communication.

The choice between one or the other of the strategies for getting in contact with a self-powered node is then two-fold: either by transmission of a wakeup signal, or by continuation of an existing communication.

The invention claimed is:

1. A method of communication between a first node, a second node, and a third node of a home-automation installation, the method comprising the following steps:
   transmission of a first information message from a first transmitting part of the first node to a second receiving part of the second node,
   following reception of the first information message by the second node, transmission of a confirmation signal from a second transmitting part of the second node to a first receiving part of the first node, the confirmation signal comprising a signal confirming to the first node that the first information message has indeed-been received and understood, maintaining the first receiving part in the active state so as to be ready to receive a transmission of a second information message if the confirmation signal received by the first node contains a conversation continuation indicator signaling to the first node that the second information message has yet to be received and placing the first receiving part in the inactive state otherwise, if the confirmation signal received by the first node contains the conversation continuation indicator, transmission of the second information message from the second transmitting part of the second node to the first receiving part of the first node following transmission of the confirmation signal, wherein the second information message comprises a signal informing the first node that the third node wishes to establish contact with the first node, following reception of the second information message by the first node, the first receiving part is set to remain in the active state so as to be ready to receive a third information message comprising information to establish contact with the third node.

2. The method of communication as claimed in claim 1, wherein the indicator signals a quantity of data to be received or a duration for which the first receiving part must be maintained in the active state.

3. The method of communication as claimed in claim 1, wherein the receiving part toggles to the inactive state
in the absence of a conversation continuation indicator in the second information message, or
following the reception of a message signaling the end of the communication between the nodes.

4. The method of communication as claimed in claim 1, wherein a part of a data set sent in the confirmation signal constitutes the information according to which the first receiving part must remain in the active state, the remainder of the data set being sent in one or more signals posterior to the confirmation signal.

5. The method of communication as claimed in claim 1, wherein the transmission of a signal by the first transmitting part is synchronized with a phase of listening of the second receiving part.

6. The method of communication as claimed in claim 1, wherein the first node makes contact with the third node.

7. The method of communication as claimed in claim 6, wherein the active state comprises a first mode of listening during a first predetermined period then a second mode of listening during a second predetermined period.

8. The method of communication as claimed in claim 7, wherein the second mode of listening comprises a low consumption listening mode.

9. The method as claimed in claim 1, further comprising a step of transmission of the third information message from a third transmitting part of the third node to the first receiving part of the first node.

10. The method as claimed in claim 9, wherein said third information message comprises information identifying the third node and a synchronization time at which the third node is available to communicate.

11. The method as claimed in claim 1, further comprising a step of transmission of a fourth information message from the first transmitting part of the first node to a third receiving part of the third node.

12. The method as claimed in claim 11, wherein the fourth information message comprises information identifying the first node.

13. The method as claimed in claim 1, further comprising a step of transmission of a preliminary information message from a third transmitting part of the third communication node to the second receiving part of the second communication node, wherein said preliminary information message comprises information characterizing the third node.

14. A first communication node of a home-automation installation comprising a processing unit and non-transitory memory storing program instructions, wherein the first communication node is programmed to execute a method of communication between the first communication node, a second communication node, and a third communication node of the home-automation installation using a processor, the method comprising:

transmission of a first information message from a first transmitting part of the first communication node to a second receiving part of the second communication node, following reception of the first information message by the second communication node, transmission of a confirmation signal from a second transmitting part of the second communication node to a first receiving part of the first communication node, the confirmation signal comprising a signal confirming to the first communication node that the first information message has indeed been received and understood, maintaining the first receiving part in the active state so as to be ready to receive a transmission of a second information message if the confirmation signal received by the first communication node contains a conversation continuation indicator signaling to the first communication node that the second information message has yet to be received and placing the first receiving part in the inactive state otherwise, if the confirmation signal received by the first communication node contains the conversation continuation indicator, transmission of the second information message from the second transmitting part of the second communication node to the first receiving part of the first communication node following transmission of the confirmation signal, wherein the second information message comprises a signal informing the first node that the third communication node wishes to establish contact with the first communication node, following reception of the second information message by the first communication node, the first receiving part is set to remain in the active state so as to be ready to receive a third information message comprising information to establish contact with the third communication node.

15. The first communication node as claimed in claim 14, wherein the first communication node is self-powered.

16. The first communication node as claimed in claim 14, wherein said first communication node is a sensor able to detect an event.

17. The first communication node as claimed in claim 16, wherein said event is of a meteorological type.

18. A home-automation installation comprising at least one first communication node, at least one second communication node, and at least one third communication node, wherein the at least one first communication node is adapted to transmit a first information message from a first transmitting part to a second receiving part of the at least one second communication node, and wherein the at least one second communication node is adapted to transmit a confirmation signal from a second transmitting part to a first receiving part of the at least one first communication node upon reception of the first information message, the confirmation signal comprising a signal confirming to the first communication node that the first information message has been received and understood, further wherein the first receiving part is maintained in the active state so as to be ready to receive a transmission of a second information message if the confirmation signal received by the at least one first communication node contains a conversation continuation indicator signaling to the first communication node that the second information message has yet to be received and placed in the inactive state otherwise, further wherein, if the confirmation signal received by the first communication node contains the conversation continuation indicator, transmission of the second information message from the second transmitting part of the second communication node to the first receiving part of the first communication node following transmission of the confirmation signal, wherein the second information message comprises a signal informing the first communication node that the third communication node wishes to establish contact with the first communication node, and, following reception of the second information message by the first communication node, the first receiving part is set to remain in the active state so as to be ready to receive a third information message comprising information to establish contact with the third communication node.

* * * * *